United States Patent
Brew et al.

(10) Patent No.: US 10,300,850 B2
(45) Date of Patent: May 28, 2019

(54) ADAPTIVE SIGNAL TRANSMISSION WHICH CAN LEARN THE EFFECTIVENESS OF A SIGNAL TRANSMISSION ACTION

(71) Applicant: International Business Machines Corporation, Armonk, NY (US)

(72) Inventors: Kevin Wayne Brew, Yorktown Heights, NY (US); Michael S. Gordon, Yorktown Heights, NY (US); James Robert Kozloski, Yorktown Heights, NY (US); Ashish Kundu, Yorktown Heights, NY (US); Clifford A. Pickover, Yorktown Heights, NY (US)

(73) Assignee: INTERNATIONAL BUSINESS MACHINES CORPORATION, Armonk, NY (US)

(\*) Notice: Subject to any disclaimer, the term of this patent is extended or adjusted under 35 U.S.C. 154(b) by 0 days.

(21) Appl. No.: 15/830,138

(22) Filed: Dec. 4, 2017

(65) Prior Publication Data

US 2018/0215311 A1 Aug. 2, 2018

Related U.S. Application Data (63) Continuation of application No. 15/420,638, filed on Jan. 31, 2017, now Pat. No. 9,919,560.

(51) Int. Cl.
*B60Q 5/00* (2006.01)
*G10K 15/02* (2006.01)

(52) U.S. Cl.
CPC ............ *B60Q 5/005* (2013.01); *G10K 15/02* (2013.01)

(58) Field of Classification Search
CPC ......... A61B 5/746; G08G 1/166; G08G 1/167

USPC ....... 340/425.5, 435, 902–906, 572.1, 573.1, 340/384.1

See application file for complete search history.

(56) References Cited

U.S. PATENT DOCUMENTS

| | | |
|---|---|---|
| 9,159,236 B2 | 10/2015 | Lord et al. |
| 2004/0022416 A1 | 2/2004 | Lemelson et al. |
| 2014/0055260 A1* | 2/2014 | Chhaunker ............... H03G 3/02 340/474 |
| 2015/0091740 A1* | 4/2015 | Bai ........................ G08B 21/06 340/901 |
| 2017/0190331 A1* | 7/2017 | Gupta ..................... B60Q 1/346 |
| 2018/0065504 A1* | 3/2018 | Lan ........................ B60N 2/002 |

FOREIGN PATENT DOCUMENTS

DE 202009017301 U1 6/2011

OTHER PUBLICATIONS

Mel, et al. "The NIST Definition of Cloud Computing". Recommendations of the National Institute of Standards and Technology. Nov. 16, 2015.

United States Notice of Allowance dated Nov. 7, 2017, in U.S. Appl. No. 15/420,638.

(Continued)

*Primary Examiner* — Joseph H Feild
*Assistant Examiner* — Sharmin Akhter
(74) *Attorney, Agent, or Firm* — Kevin Jordan, Esq.; McGinn IP Law Group, PLLC (57) ABSTRACT

A signal transmission control method, system, and computer program product, include an advanced vehicle signal transmission control according to a context of the vehicle where a differential signal transmission action is performed based on the context.

20 Claims, 4 Drawing Sheets

(56) References Cited

OTHER PUBLICATIONS

United States Office Action dated Oct. 17, 2017, in U.S. Appl. No. 15/420,638.
United States Office Action dated Sep. 1, 2017, in U.S. Appl. No. 15/420,638.

* cited by examiner

ADAPTIVE SIGNAL TRANSMISSION WHICH CAN LEARN THE EFFECTIVENESS OF A SIGNAL TRANSMISSION ACTION

CROSS-REFERENCE TO RELATED APPLICATIONS

The present application is a Continuation Application of U.S. patent application Ser. No. 15/420,638, filed on Jan. 31, 2017, the entire contents of which are hereby incorporated by reference.

BACKGROUND

The present invention relates generally to a signal transmission control technique, and more particularly, but not by way of limitation, to a system for taking differential signal transmission actions based on a context of the vehicle.

SUMMARY

In an exemplary embodiment, the present invention can provide a computer-implemented signal transmission control method, the method including detecting a context of a vehicle and controlling a signal transmission of the vehicle to take a differential signal transmission action based on the context of the vehicle.

One or more other exemplary embodiments include a computer program product and a system.

The above summary will be described in more detail below with reference to the drawings. It is to be understood that the invention is not limited in its application to the construction and/or arrangements of the components set forth in the following description and/or illustrated in the drawings. Also, it is to be understood that the phraseology and terminology employed are for the purpose of description and should not be regarded as limiting.

It is important, therefore, that the claims appended hereto be regarded as including such constructions and arrangements insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

For example and by way of overview, it is noted that a vehicle can include many devices. A few (non-limiting) examples of vehicles include: a car, a truck, a boat, a motorcycle, a tractor, a bus, a train, a cable car, a drone, a plane, a self-driving (or automated) vehicle, a bike, a sled, a hover-board, a personal transporter such as a Segway® Personal Transporter, etc.

In some embodiments, the vehicle/horn (e.g., signal transmission) may adaptlleam through crowd feedback from crowds, and/or information accessed from various data stores. For example, the vehicle may adapt based on info about prior accidents, and/or about what measures have been most effective in the past. In other words, some embodiments of the present invention may act in a more sophisticated and useful fashion, and in a cognitive manner e.g., give the impression of cognitive mental abilities and processes related to knowledge, attention, memory, judgment and evaluation, reasoning, and advanced computation. For example, a system/method may be considered "cognitive" if it possesses macro-scale properties—perception, goal-oriented behavior, learning/memory and action—that characterize systems (i.e., humans) that are generally agreed as cognitive.

Figure 1:
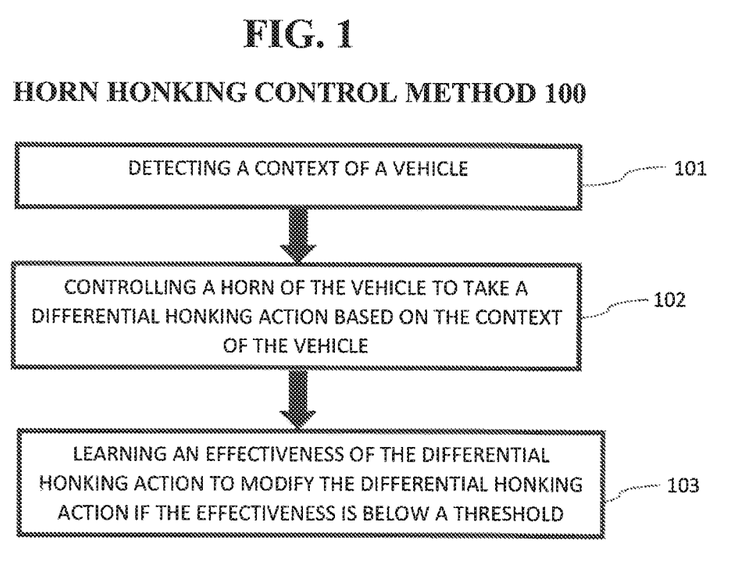
FIG. 1 depicts a high-level flow chart for a computer-implemented method of signal transmission control, according to an embodiment of the present invention.

FIG. 1 depicts a signal transmission control method 100 according to an embodiment of the present invention. The following example is of a computer-implemented method that includes various steps for controlling and learning the signal transmission action based on a context of the vehicle.

Referring now specifically to FIG. 1, in step 101, a context of the vehicle is detected. The external context may include detection (e.g., image, audible, etc.) of an object (a pothole, another vehicle, a person, animal or other obstruction) within the range of one or more vehicle sensors. A few (non-limiting examples of such animals include: deer, moose, elk, kangaroo, horse, cattle, birds, etc.). In some embodiments, the context may include a history of animal behaviors and/or accidents in the subject area. It is noted that the invention herein can identify a breed of an animal and then take an action according to the different breed (as described later).

In some embodiments, deep neural nets (e.g. ConvNets or the like) can be used to differentiate among different types of objects. For example. the context can consider the subject vehicle, an identification of an animal in the vicinity of the vehicle as well as a type of the animal, since different actions may be required based on contextual specifics e.g., the type of animal. The context can also include a characteristic of a pedestrian (e.g., a person in a wheel chair, a group of people talking to one another in a distracted way, a child, a child walking a dog, etc.) and a history of the pedestrians or accidents in area.

In some embodiments, the context may include detection of a disabled person in the vicinity of the vehicle. For example, a visually-or-hearing impaired person detected in the vicinity of the vehicle through a device carried by the person that can communicate such information or through image processing. Further, the context can consider the type(s) of other vehicle(s) detected in the vicinity of the vehicle. For example, the context can include detecting if a train, a passenger vehicle, a large truck, a self-driving vehicle (SDV), etc. is in the vicinity of the vehicle since a different signal transmission action may be appropriate, based on the type of vehicle.

In some embodiments, the context can consider behavior patterns associated with the identified context. For example, the behavior of a single or group of bicycle riders detected in the vicinity of the vehicle can be contextually considered. For example, a signal transmission might sound from afar to warn a group of bike riders riding abreast of one-another of an approaching car, without unnecessarily distracting them. In another example, some animals may react differently to different sounds e.g., of a vehicle or a signal transmission. In some embodiments, the behavioral characteristics of the animals are associated with the context when the animal is detected.

In some embodiments, the context detected can be combined with temporal recognition. For example, a Recurrent Neural Network (RNN) may be employed to discern if a hazard is rapidly approaching. The detection of a rapidly approaching object may automatically trigger the signal transmission and may increase the volume of the response (or other audio characteristics) depending on the assessed hazard. In other words, the context can include both of a context of the vehicle and a temporal element of the detected context.

In some embodiments, the context of the vehicle is related to one or more other factors: the environment of the vehicle: e.g., weather; day vs night; road conditions; geographic location such as rural vs. urban vs. Africa vs. United States; a current season (e.g., winter or summer); etc. Other contextual factors can be related to other vehicles (e.g. a vehicle detected in front of the subject vehicle is a truck, motorcycle, etc., having a certain estimated distance required for stopping; one or more passengers of the vehicle e.g., if a passenger is experiencing a medical emergency, etc.

In step 102, a signal transmission of the vehicle is controlled to take a differential signal transmission action based on the context of a vehicle. For example, the differential signal transmission action can include, for example, timbre of the signal transmission including sound waveform, a frequency of the signal transmission, a volume of the signal transmission, an oscillation rate of the signal transmission, a duration of the signal transmission, an amplitude of the signal transmission, a sustainment of the signal transmission, a decay of the signal transmission, a release of the signal transmission, a speed of the onset (e.g. more vigilant and likely to honk faster if pedestrian appears to be distracted and looking at a smartphone), an ultrasonic signal transmission (e.g. audible to an animal but not necessarily to a human), coupling the signal transmission action with the head-lights of the vehicle, etc. Thus, the mode of the signal transmission is selected based on the context.

In step 102a, an effectiveness of the signal transmission action can be measured and then in step 102b compared with a predetermined threshold value. If the effectiveness is less than the threshold value, the signal transmission action can be modified (i.e., such as increasing the volume, changing the type of signal transmission action, etc.). If the threshold value is met (i.e., the effectiveness is greater than the threshold value, the method proceeds to step 103.

It is noted that the timing and volume of the signal transmission may change depending on areas where animals are more likely to be, location, local regulations, time of day, season, etc. For example, a differential signal transmission action may be sensitized to honk a little sooner or louder, even if the confidence level about an animal is not 100%, if several animals e.g., deer have been killed in the same location (or vicinity thereof) over the last 5 years.

A tri-stimulus may be altered (e.g., the differential signal transmission action may include an altered tri-stimulus), in order to achieve different attention-getting effects, be in compliance with local noise ordinances, and/or even be more harmonious in an urban or rural location concerned with noise pollution. For example, a musical tri-stimulus can measure the mixture of harmonics in a given sound, grouped into three sections. The first tri-stimulus section measures the relative weight of the first harmonic, the second tri-stimulus section measures the relative weight of the second, third, and fourth harmonics taken together, and the third tri-stimulus section measures the relative weight of all the remaining harmonics.

The differential signal transmission action can include altering the waveform of the sound. For example, variations of four basic waveforms can include altering the waveform to be a sine, square, triangle, and saw-tooth waveform. Further, the differential signal transmission action can include altering the signal transmission to emit a siren type sound similar to an emergency vehicle. For example, if a context is detected that a passenger of the car is suffering a life-threatening injury and must be driven to a hospital immediately, the signal transmission can be altered to be a siren. The signal transmission can include a non-audible action such as flashing the headlights with the signal transmission.

In some embodiments, the differential signal transmission actions can involve control changes to a standard signal transmission. For example, a timer/oscillator may be selectively connectable between the vehicle signal transmission actuator (e.g., the button on the steering wheel of the vehicle) and the vehicle signal transmission. When the timer is connected between the signal transmission actuator and the signal transmission, a continuous input to the signal transmission actuator is converted to an intermittent signal transmission output (preferably cycling between 2-20 Hz), this intermittent signal transmission output being synchronized with the timer pulses. Such cycling of the signal transmission can cause a flight response in animals when sounded in their vicinity. This signal transmission mode can be automatically selected by an automated assessment that a deer (or other animal) is ahead with a confidence level. The signal transmission may be triggered when a user calls for the signal transmission, or the signal transmission may automatically be sounded. Further, some animals react differently to signal transmission than other animals. Thus, based on detected of a type of animal, a mode of signal transmission can be selectively activated.

By way of further example, the vehicle signal transmission mode, vigilance, and acoustic characteristics may be associated with a component defined by a policy, retrieved from a database that contains sound and other settings mapped to the current value, and modifies operation of the signal transmission in the vehicle to produce a volume and other characteristics corresponding to the setting when an operator of the vehicle activates the signal transmission.

In step 103, an effectiveness of the differential signal transmission action is learned to modify the differential signal transmission action if the effectiveness is below a threshold. That is, if the differential signal transmission action is not effective at, for example, dispersing pedestrians in a proximity of the vehicle, the different signal transmission action is modified to take a differential type of differential signal transmission action next time (e.g., modifying a tri-stimulus, volume, type, etc.).

The signal transmission may learn provided external data of local hazards or from the context-detection generated data from other vehicles (e.g. several triggered context-detections in a woodland area during Fall from separate vehicles may increase neural net weights for another vehicle's context-detection in that location and time.

By way of further example, the differential signal transmission action can ameliorate difficulties and uncertainties surrounding the alerting between self-driving vehicles (SDVs) or between an SDV and a human-driven vehicle (e.g., the context detected identifies the driver of the vehicle and the driver of the vehicle in the proximity of the vehicle). That is, a cognitive-enabled signal transmission is useful for determining which of the possible alerting schemes are needed in any given situation (i.e., SDV to SDV, SDV to human driver (HD), HD to SDV, HD to HD, SDV to SDV and HD, and HD to SDV and HD. It is noted that SDV and HD refers to vehicles that may not be fully self-driven and still require some human interaction.

The use of cognitive assessment and evaluation of current context to determine if an alert necessarily must be passed to the human occupants of a vehicle, in which case a human-targeted alert (e.g., a traditional signal transmission, a cabin audio alert, a seat vibration, etc.) is needed for the human to become aware of the situation and take an action.

In addition, the ability of an SDV to receive alerts from a human, to indicate information such as "Please drive a bit farther behind, you are making me uncomfortable." Or, if an SDV and a human driven vehicle are stopped at an intersection, alerting the human driven vehicle that the other vehicle is an SDV can assist the human driven vehicle in making decisions on how to proceed through the intersection.

Differential signal transmission may then be used to target the signal transmission to a passenger or an SDV, and further the signal transmission may sound differently depending on whether it was initiated by a human or an SDV.

It is noted that most honks are broadcast-based, which leads to the confusion in a crowded traffic as to who honked, for whom and why. In some embodiments, a honk multi-cast or uni-cast as the differential signal transmission action can be included. This can allow a driver (or the self-driving car) to determine which other vehicles are to receive the honk and be notified of certain issues, or reason of signal transmission.

In some embodiments, the signal transmission source can determine the registration number or other numbers of the vehicles as part of the context, or identify the car using a server that knows the geolocation of the cars. It then sends the honk to these vehicles only and to no other vehicles. Based on the way the received honks are processed by the recipient vehicles as per regulation, it processes and notifies the driver (i.e., audibly and/or visually) or makes a sound in the car, makes some vibration of the driver seats or such other actions. The driver or the car may notify the honk source as the notification has been received, and an action may or may not be carried out as requested.

In other embodiments, the differential signal transmission action can factor in local ordinances or laws that limit the type of honk or use of signal transmission.

Figure 2:
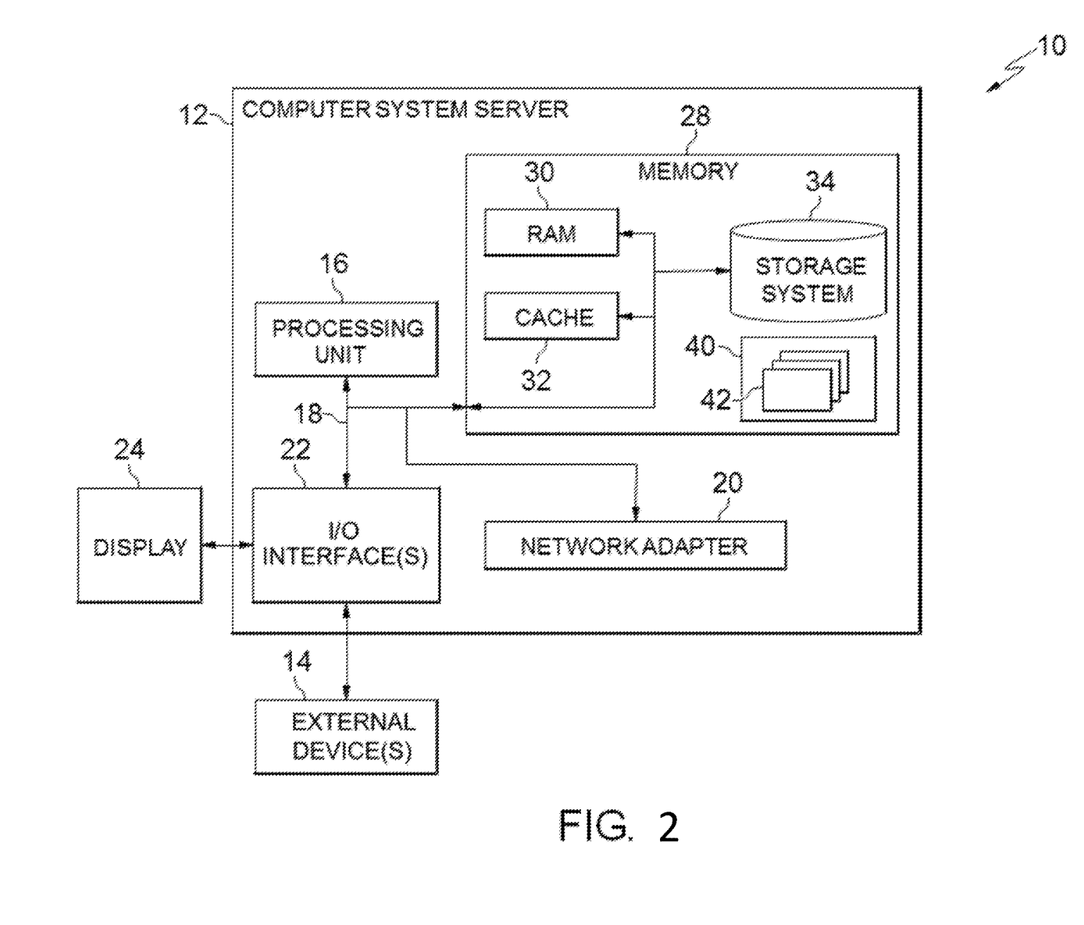
FIG. 2 depicts a cloud computing node according to an embodiment of the present invention.

Referring also now to FIG. 2, one or more computers of a computer system 12 according to an embodiment of the present invention can include a processing unit 16 that is operably coupled to a memory 28 having program instructions stored therein that when executed, cause the computer to perform the steps of FIG. 1.

As will described/illustrated in more detail below, one or more embodiments of the present invention may be implemented in a cloud environment (see e.g., FIGS. 2-4). It is nonetheless understood that the present invention can be implemented outside of the cloud environment.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 2 depicts a an example of a computing node in accordance with the present invention. Although computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer server 12 is only one example of a suitable computing node and is not intended to suggest any limitation as to the scope of use or functionality of embodiments of the invention described herein. Regardless, computer server 12 is capable of being implemented and/or performing any of the functionality set forth herein.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in cloud computing environments (see e.g., FIG. 3) where tasks are performed by remote processing circuits that are linked through a communications network. In a distributed cloud computing environment, program modules may be located in both local and remote computer system storage media including memory storage circuits.

Referring again to FIG. 2, computer system/server 12 is shown in the form of a general-purpose computing circuit. The components of computer system/server 12 may include, but are not limited to, one or more processors or processing units 16, a system memory 28, and a bus 18 that operably couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted, memory 28 may embody/store program/utility 40, that further includes a set (i.e., of one or more) program modules 42. The program modules 42 may embody one or more application programs configured to carry out one or more functions of the present invention. By way of example, and not limitation, program/utility 40 may also include an operating system, one or more other application programs, other program modules, and/or data. Each of the operating system, one or more application programs, other program modules, and program data or some combination thereof, may include implementation in a networking environment.

Computer system/server 12 also includes input/output (I/O) interfaces 22 and network adapter 20 that facilitate communication with system users and/or one or more external devices 14. In other words and by way of example only, input/output (I/O) interfaces 22 generally facilitate user (and other) interaction with computer system/server 12; and include components (e.g., network card, modem, etc.) that enable computer system/server 12 (and/or users thereof) with network adapter 20, to communicate with one or more other external devices (and/or users thereof). A few examples of such external devices include: nodes, devices and computer systems servers; vehicle sensor(s); a keyboard, a pointing circuit, a display 24, and other devices. As depicted in FIG. 2, network adapter 20 communicates with other components of computer system/server 12 via bus 18.

It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc. Examples of networks include (but are not limited to) a local area network (LAN), a general wide area network (WAN), and/or a public network (e.g., the Internet). Examples of a network (cloud) implementation will be described in detail with reference to FIG. 3

Figure 3:
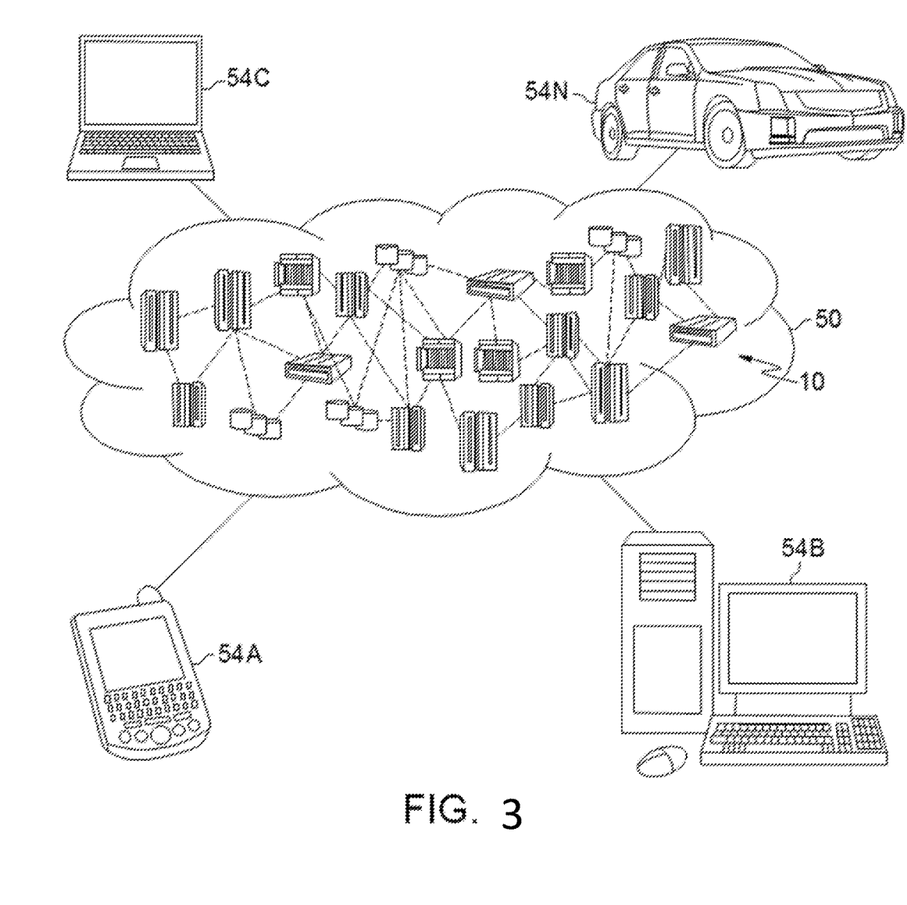
FIG. 3 depicts a cloud computing environment according to an embodiment of the present invention.

Referring now to FIG. 3, illustrative cloud computing environment 50 is depicted. As shown, cloud computing environment 50 comprises one or more nodes 10 (e.g., computer system 12 (FIG. 3) with which computing circuits and/or computing devices used by cloud consumers—such as, for example, personal digital assistant (PDA) or cellular telephone 54A, desktop computer 54B, laptop computer 54C, and/or automobile computer system 54N—may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
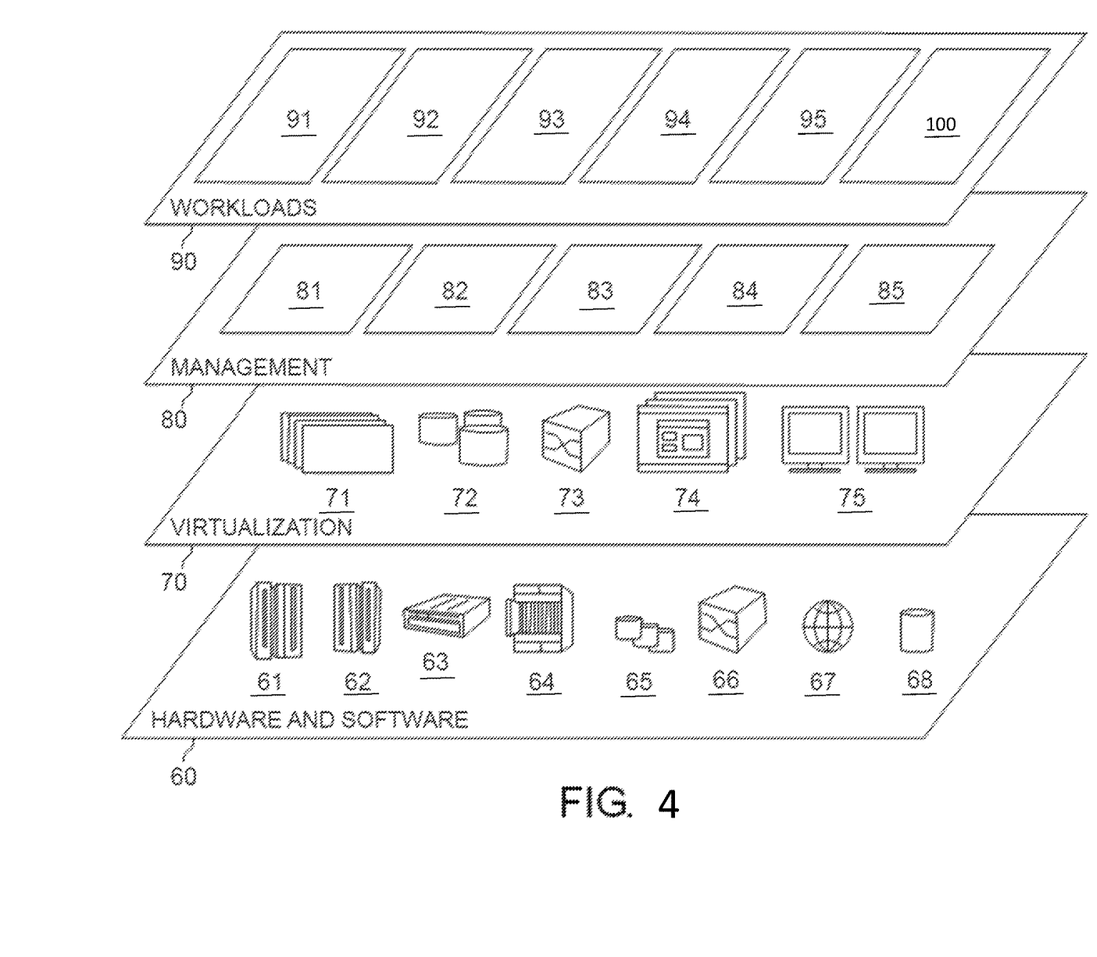
FIG. 4 depicts abstraction model layers according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the method 100 (FIG. 1).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented signal transmission control method, the method comprising:
   detecting a context of a subject vehicle via a sensor collecting data related to the subject vehicle;
   determining a type of the subject vehicle via a sensor, the type being one of a self-driving-vehicle (SDV) and a human controlled vehicle; and
   controlling a signal transmission of the vehicle to take a differential signal transmission action via a signal transmission device of the vehicle based on the context of the vehicle and the type of the vehicle to ameliorate a risk related to the context,
   wherein the differential signal transmission action when the determining determines the type of the subject vehicle is the SDV is different than the differential signal transmission action when the determining determines the type of the subject vehicle is the human controlled vehicle.

2. The computer-implemented method of claim 1, wherein the context is based on an environment surrounding the vehicle.

3. The computer-implemented method of claim 1, wherein the context is selected from a group consisting of:
   a subject vehicle-related factor;
   a subject-vehicle-to-related-vehicle related factor; and
   a passenger-related factor.

4. The computer-implemented method of claim 1, wherein the context is selected from a group consisting of:
   a type of animal in a vicinity of the vehicle and a history of the type of animal in a location of the vehicle; and
   a characteristic of a pedestrian in the vicinity of the vehicle.

5. The computer-implemented method of claim 1, wherein the differential signal transmission action includes modifying a sound characteristic of the signal transmission selected from a group consisting of:
   a timbre;
   an amplitude;
   a tristimulus;
   a speed of onset; and
   a frequency of the signal transmission to ultrasonic.

6. The computer-implemented method of claim 1, wherein said detecting a context of the subject vehicle includes detecting an emergency and said controlling controls the differential signal transmission action to emit a siren sound, in response to said detecting.

7. The computer-implemented method of claim 1, wherein said detecting a context of the subject vehicle further comprises detecting a temporal change and said controlling further comprises modifying the differential signal transmission action, in response to said detecting.

8. The computer-implemented method of claim 1, wherein the differential signal transmission action includes a non-audible action.

9. The computer-implemented method of claim 1, wherein the controlling modifies the differential signal transmission action based on a self-driving vehicle being a second vehicle in the detected context.

10. The computer-implemented method of claim 1, wherein said detecting a context of the subject vehicle further comprises detecting if at least one of the subject vehicle is a self-driving vehicle or a human-driven vehicle;
wherein said controlling further comprises modifying the differential signal transmission action, in response to said detecting.

11. The computer-implemented method of claim 10, wherein the detecting further comprises detecting a relationship between the subject vehicle and a detected vehicle and said modifying is in response to said detecting.

12. The computer-implemented method of claim 1, embodied in a cloud-computing environment.

13. A computer program product for signal transmission control, the computer program product comprising a non-transitory computer-readable storage medium having program instructions embodied therewith, the program instructions executable by a computer to cause the computer to perform:
detecting a context of a subject vehicle via a sensor collecting data related to the subject vehicle;
determining a type of the subject vehicle via a sensor, the type being one of a self-driving-vehicle (SDV) and a human controlled vehicle; and
controlling a signal transmission of the vehicle to take a differential signal transmission action via a signal transmission device of the vehicle based on the context of the vehicle and the type of the vehicle to ameliorate a risk related to the context,
wherein the differential signal transmission action when the determining determines the type of the subject vehicle is the SDV is different than the differential signal transmission action when the determining determines the type of the subject vehicle is the human controlled vehicle.

14. The computer program product of claim 13, wherein the context is based on an environment surrounding the vehicle.

15. The computer program product of claim 13, wherein the context is selected from a group consisting of:
a subject vehicle-related factor;
a subject-vehicle-to-related-vehicle related factor; and
a passenger-related factor.

16. The computer program product of claim 13, wherein the context is selected from a group consisting of:
a type of animal in a vicinity of the vehicle and a history of the type of animal in a location of the vehicle; and
a characteristic of a pedestrian in the vicinity of the vehicle.

17. The computer program product of claim 13, wherein the differential signal transmission action includes modifying a sound characteristic of the signal transmission selected from a group consisting of:
a timbre;
an amplitude;
a tristimulus;
a speed of onset; and
a frequency of the signal transmission to ultrasonic.

18. The computer program product of claim 13, wherein said detecting a context of the subject vehicle includes detecting an emergency and said controlling controls the differential signal transmission action to emit a siren sound, in response to said detecting.

19. A signal transmission control system, comprising:
a processor; and
a memory operably coupled to the processor, the memory storing program instructions that when executed cause the system to:
detecting a context of a subject vehicle via a sensor collecting data related to the subject vehicle;
determining a type of the subject vehicle via a sensor, the type being one of a self-driving-vehicle (SDV) and a human controlled vehicle; and
controlling a signal transmission of the vehicle to take a differential signal transmission action via a signal transmission device of the vehicle based on the context of the vehicle and the type of the vehicle to ameliorate a risk related to the context,
wherein the differential signal transmission action when the determining determines the type of the subject vehicle is the SDV is different than the differential signal transmission action when the determining determines the type of the subject vehicle is the human controlled vehicle.

20. The system of claim 19, embodied in a cloud-computing environment.

* * * * *